July 17, 1928.
T. J. MELL
1,677,284
SHEET MATERIAL AND METHOD OF MAKING AND MOUNTING THE SAME
Filed April 23, 1926
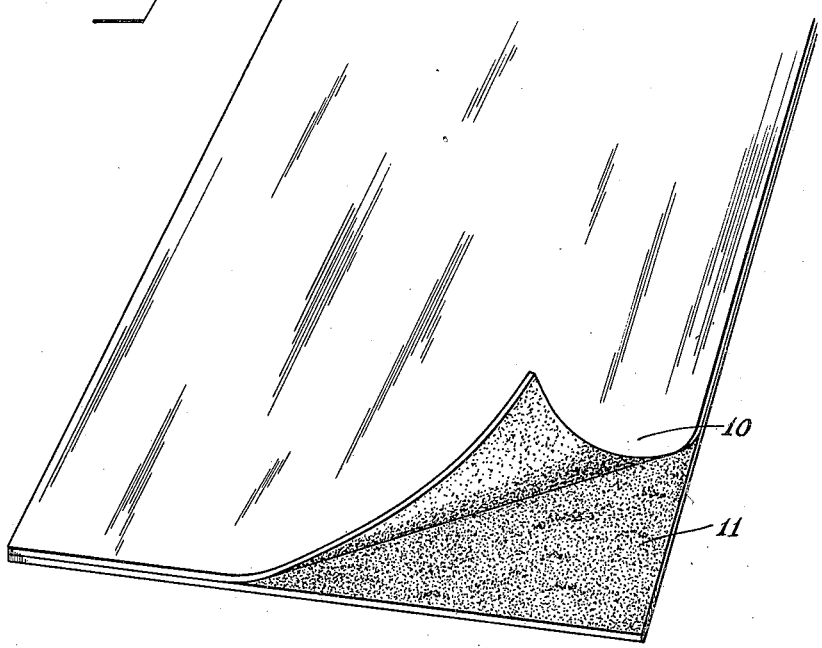
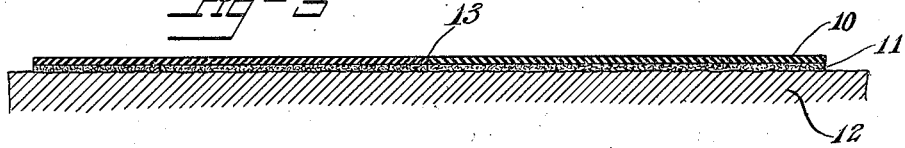
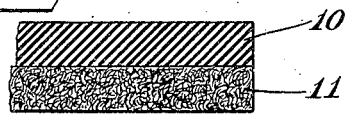

Patented July 17, 1928.

1,677,284

UNITED STATES PATENT OFFICE.

TOD J. MELL, OF AKRON, OHIO, ASSIGNOR TO THE B. F. GOODRICH COMPANY, OF NEW YORK, N. Y., A CORPORATION OF NEW YORK.

SHEET MATERIAL AND METHOD OF MAKING AND MOUNTING THE SAME.

Application filed April 23, 1926. Serial No. 104,126.

This invention relates to sheet material and methods of making and mounting the same, as a covering, and especially floor coverings or the like having a rubber facing.

Heretofore rubber floor coverings have comprised rubberized-fabric backings vulcanized to the tread or facing sheet of rubber and securing such coverings to a floor by the use of a rubber cement or an adhesive containing a rubber solvent has had the disadvantage that the rubber solvent migrates into the rubber and causes the latter to swell and become softened and uneven in form. On the other hand, adhesives containing water or miscible with water have had the disadvantage that they do not dry quickly when used between the rubber sheet and the floor, and poor adhesion and deterioration of the rubber result.

My chief object is to provide a floor covering comprising rubber which may be secured to the floor by the use of an adhesive containing a rubber solvent, for advantages such as exclusion of water, quick-setting and permanent flexibility of the adhesive, without damaging effects above described. Further objects are to provide high quality in conjunction with economy, and to provide a floor covering having a somewhat plastic backing adapted to conform to sharp irregularities in the floor, as in being indented by projections such as tack-heads or the like, without forcing the tread surface out of the desired plane form.

Of the accompanying drawings:

Fig. 1 is a perspective view of a sheet of my improved floor-covering material in its preferred form.

Fig. 2 is a section of the same.

Fig. 3 is a section of a portion of a floor and my covering material in place thereon.

Referring to the drawings, I attain the above stated objects by employing as a backing material, for a rubber tread sheet 10, a sheet of fibrous material 11 such as wool or other felt having a binder, such as a bituminous binder, adapted to be secured to the floor by an adhesive containing a rubber solvent without being swelled by the solvent, and by vulcanizing the tread sheet to the backing sheet, the backing sheet preferably being of such strength as to reinforce the rubber.

The backing sheet 11 is preferably composed of such mixture of fibers and bituminous binder as to be sufficiently plastic to be impressionable so as to receive small projections on the floor into its lower face without distortion of the rubber sheet 10.

The sheets are preferably secured to the floor 12 by a cement non-miscible with water and in joining the sheets of the material, as in a seam 13, the edges to be abutted are preferably treated with a solvent for the bituminous binder, such as gasoline, before being joined, and this causes the bituminous backing sheets to weld together in a watertight seam, which is of advantage in preventing moisture from passing in between the floor and the covering and causing separation. These features, in conjunction with the vulcanization of the rubber sheet to the bituminous backing sheet result in a waterproof structure having the further advantages of economy of production, facility of installation, and regularity of tread surface.

My invention is susceptible of modification and of different applications within its scope, and I do not desire to limit it except as it is defined in the appended claims.

I claim:

1. Sheet material comprising a sheet of rubber and, vulcanized thereto a backing sheet therefor comprising fibrous material consolidated with a binder adapted to absorb a rubber solvent without swelling.

2. Sheet material comprising a rubber sheet and a fiber and bitumen backing sheet vulcanized thereto.

3. Sheet material comprising a rubber sheet and a bituminous sheet vulcanized thereto.

4. In combination with a floor, or the like, a layer of bituminous material thereon and a layer of rubber overlying and vulcanized to the bituminous material.

5. In combination with a support such as a floor, a sheet of rubber thereon, a backing sheet for the rubber interposed between the two, the said backing sheet comprising fibrous material and a binder therefor and vulcanized to the sheet of rubber, of water-resisting cement securing the backing sheet to the support.

6. In combination with a floor, a layer of bituminous, fibrous material cemented thereto with a water-resisting cement, and a sheet of rubber overlying and vulcanized to the said layer.

7. The method of making and mounting a covering which comprises vulcanizing a sheet of rubber to a sheet of bituminous, fibrous material and securing the bituminous sheet to a surface to be covered by the use of an adhesive containing a volatile solvent non-miscible with water.

8. The method of making and mounting a covering which comprises vulcanizing sheets of rubber to respective backing sheets of bituminous material and joining the edges of the two resulting composite sheets by effecting a welding of the bituminous material of the backing sheets.

In witness whereof I have hereunto set my hand this 16th day of April, 1926.

TOD J. MELL.